Sept. 23, 1947.    M. A. MATHYS    2,427,970
HYDRAULIC CONTROL SYSTEM FOR MACHINE TOOLS AND THE LIKE
Filed Jan. 25, 1943    5 Sheets-Sheet 3
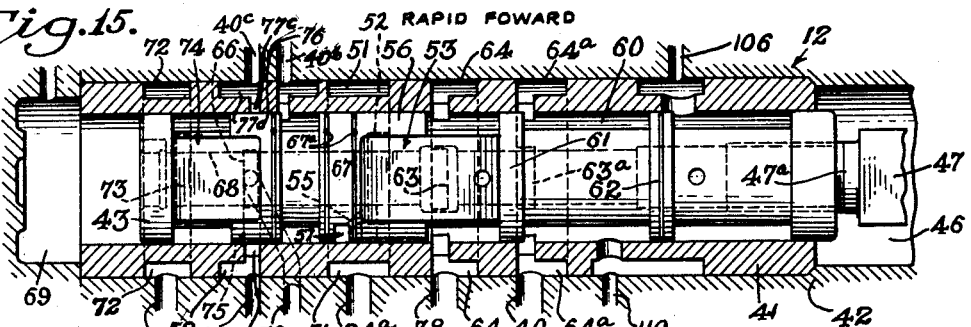
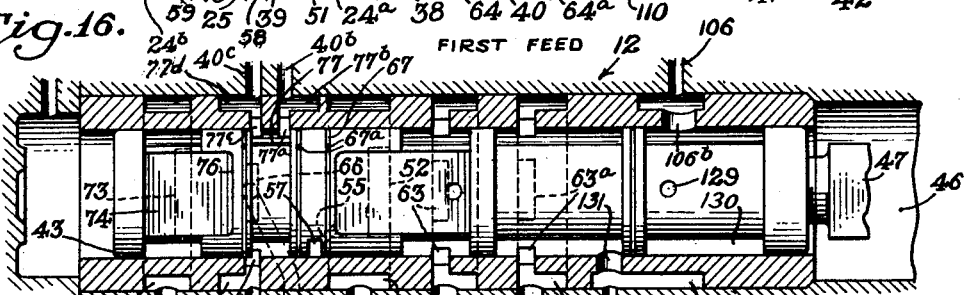
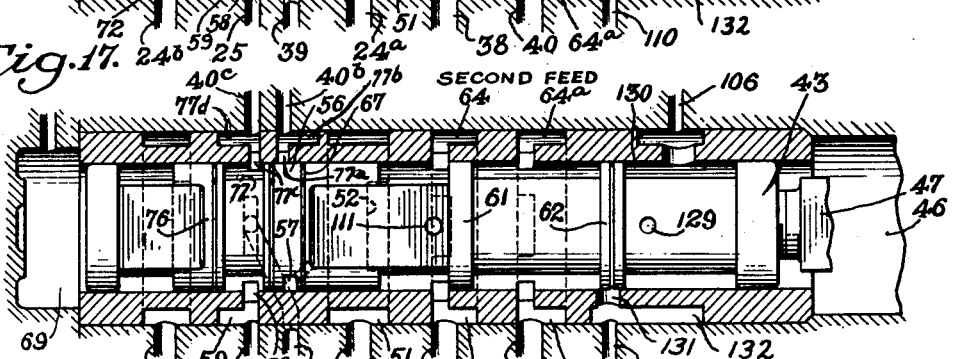
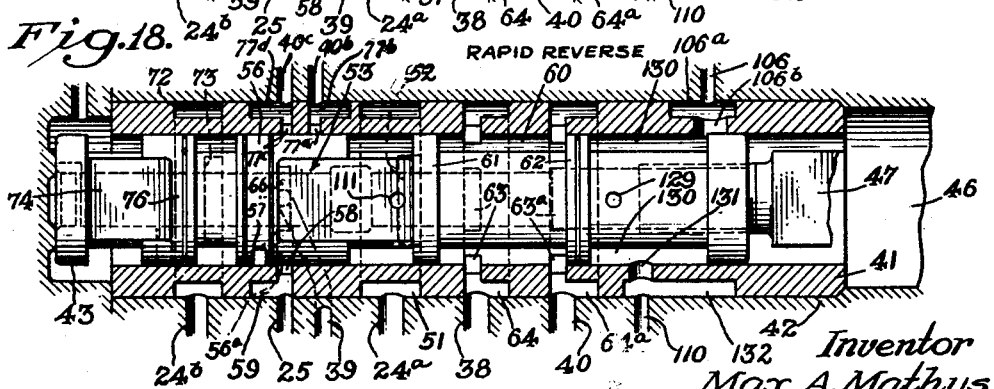
Inventor
Max A. Mathys
By
Attorneys.

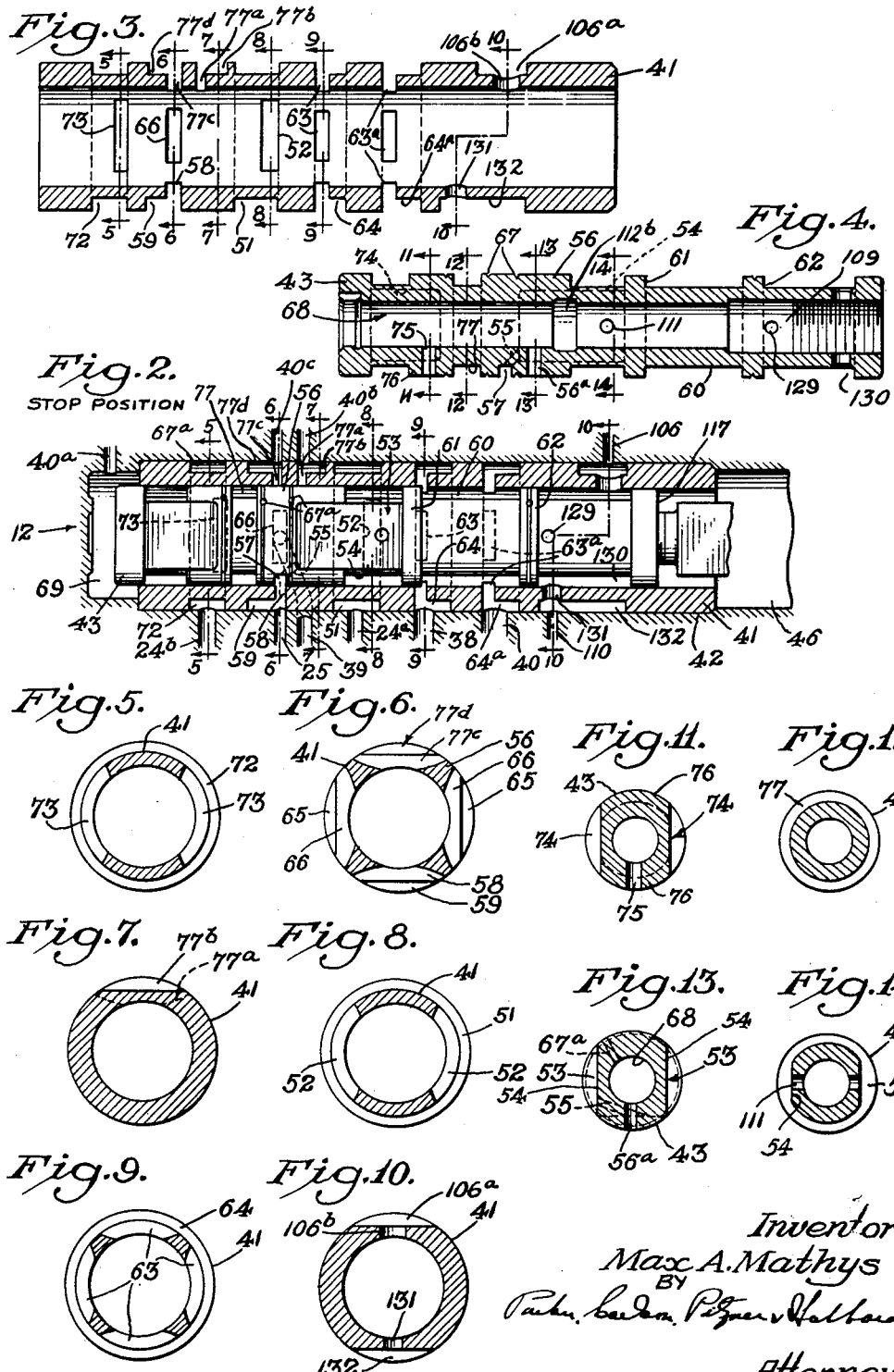

Sept. 23, 1947.                M. A. MATHYS                 2,427,970
              HYDRAULIC CONTROL SYSTEM FOR MACHINE TOOLS AND THE LIKE
                   Filed Jan. 25, 1943           5 Sheets-Sheet 4
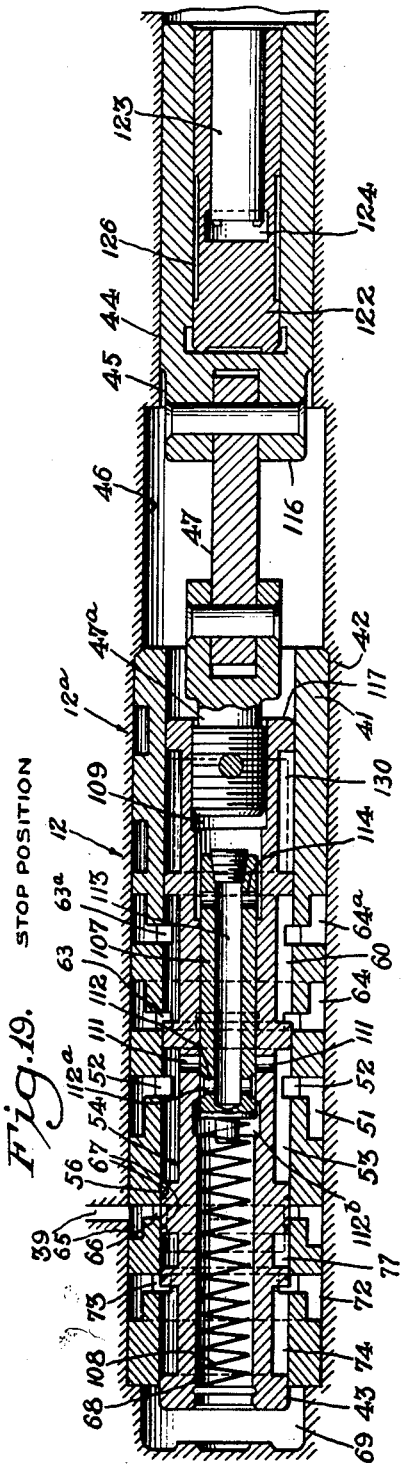
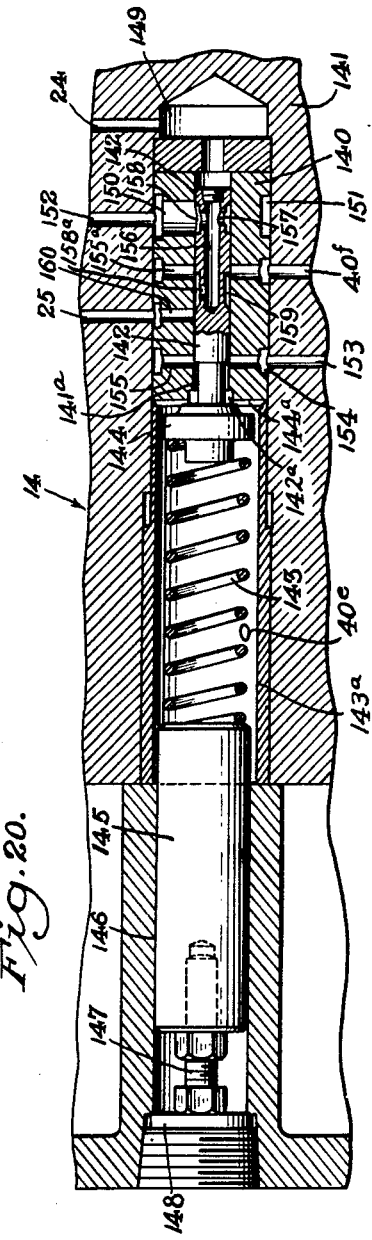
Inventor
Max A. Mathys
BY
Parker, Carlson, Pitzner & Hubbard
Attorneys.

Sept. 23, 1947. M. A. MATHYS 2,427,970
HYDRAULIC CONTROL SYSTEM FOR MACHINE TOOLS AND THE LIKE
Filed Jan. 25, 1943 5 Sheets-Sheet 5
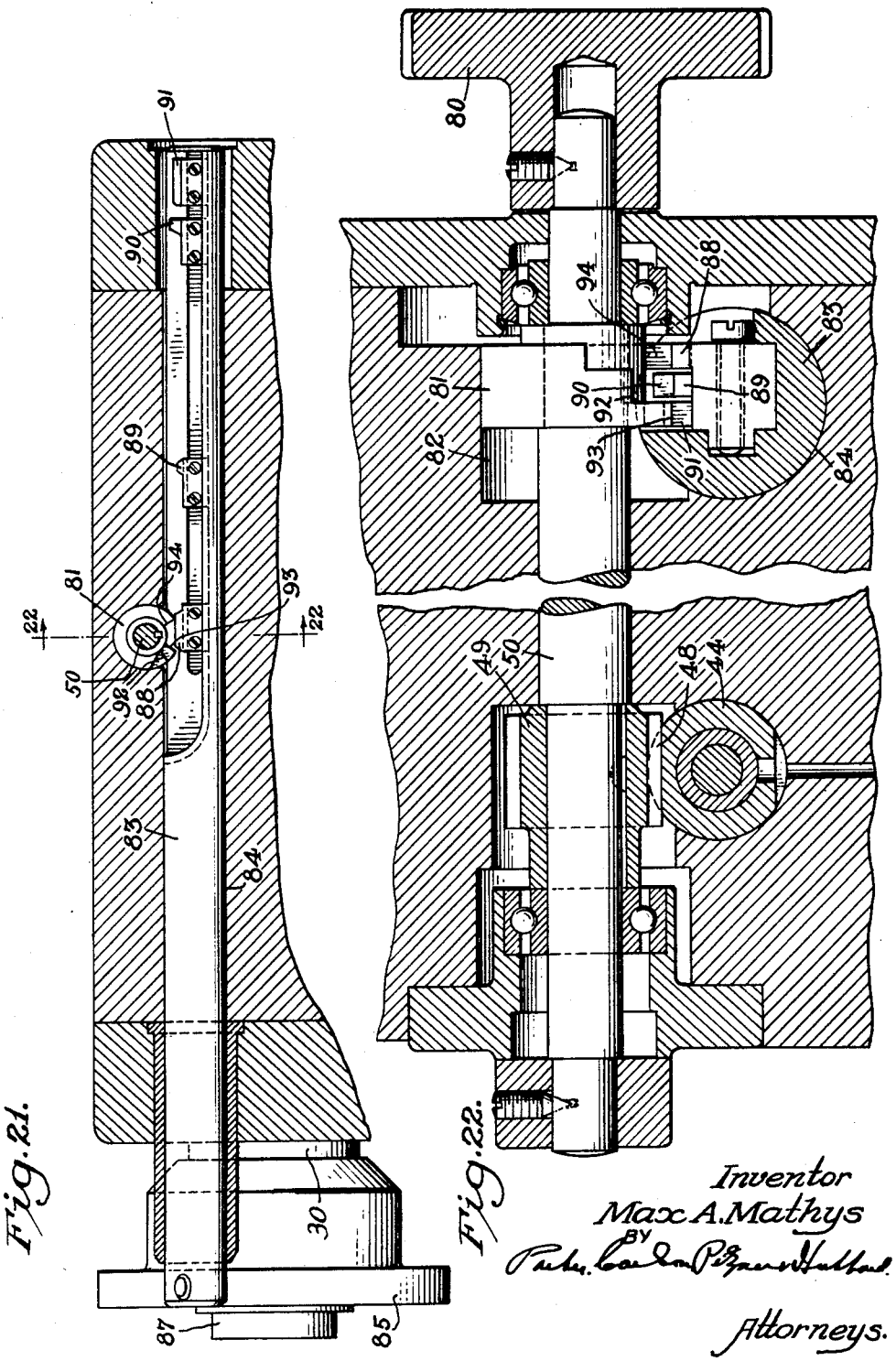
Inventor
Max A. Mathys
BY
Attorneys.

Patented Sept. 23, 1947

2,427,970

UNITED STATES PATENT OFFICE 2,427,970

HYDRAULIC CONTROL SYSTEM FOR MACHINE TOOLS AND THE LIKE

Max A. Mathys, Detroit, Mich., assignor to Ex-Cell-O Corporation, Detroit, Mich., a corporation of Michigan Application January 25, 1943, Serial No. 473,490

28 Claims. (Cl. 60—52)

The invention pertains to hydraulic systems of the character disclosed and claimed in my copending application, Ser. No. 379,211, filed February 17, 1941, issued February 25, 1947 as Patent No. 2,416,339, and especially adapted for use in the actuation and control of machine tools; and it constitutes in general an improvement upon the system disclosed in said prior application.

More specifically stated, it is one object of the present invention to provide in a hydraulic system of the character set forth in said copending application a control valve of improved construction.

Another object is to provide in a hydraulic system of the type embodying a variable delivery pump and an orifice control for adjusting the pump to regulate the speed of travel of the actuator, an improved form of orifice control whereby a plurality of feed rates may be obtained automatically during any machining cycle with each of said feed rates independently adjustable.

An important object of the invention is to provide in a hydraulic system having a variable delivery pump and a pressure responsive control device therefor, means whereby the rate of delivery of the pump may be adjusted automatically in response to a dwell or other condition tending to produce an abnormal increase in the pressure applied to the actuator in the forward movement thereof, to the end that waste of power, unnecessary heating of the hydraulic fluid and wear and tear upon the parts may be avoided.

Still another object is to provide a system of the character above indicated in which the actuator is automatically reversed when the pressure applied thereto exceeds a predetermined maximum.

Another object is to provide in combination with an adjustable variable delivery pump and a valve controlling the application of fluid pressure to an actuator, a control device of advantageous construction operative in response to an abnormal increase in the pressure applied to the actuator to effect an automatic adjustment of the pump to reduce its output, and coincidentally therewith to divert a portion of the fluid under pressure to the reversal of the valve whereby to cause a return movement of the actuator.

A further object is to provide a hydraulic control system for machine tools and the like, comprising a main control valve of improved construction and operation and having, in combination with the usual dog control mechanism for shifting the valve into various positions, a fluid pressure control operative automatically as an incident to the shifting of the valve into a stop position to impart an additional movement thereto to carry it into rapid return position, thereby dispensing with auxiliary mechanical devices ordinarily employed, such as latches, and load and fire mechanisms.

Still another object is to provide a valve mechanism of improved construction comprising an actuating section operable either manually or by means of a plurality of auxiliary hydraulic actuators automatically.

Still another object is to provide an improved control valve incorporating within it a pressure regulating valve.

The objects of the invention thus generally stated, together with other and ancillary advantages, are attained by the construction and arrangement shown by way of illustration in the accompanying drawings, in which:

Fig. 2 is a fragmentary longitudinal sectional view through the main valve with the valve member in stop position.

Figs. 3 and 4 are longitudinal vertical sectional views through the valve sleeve and valve member respectively.

Figure 1:
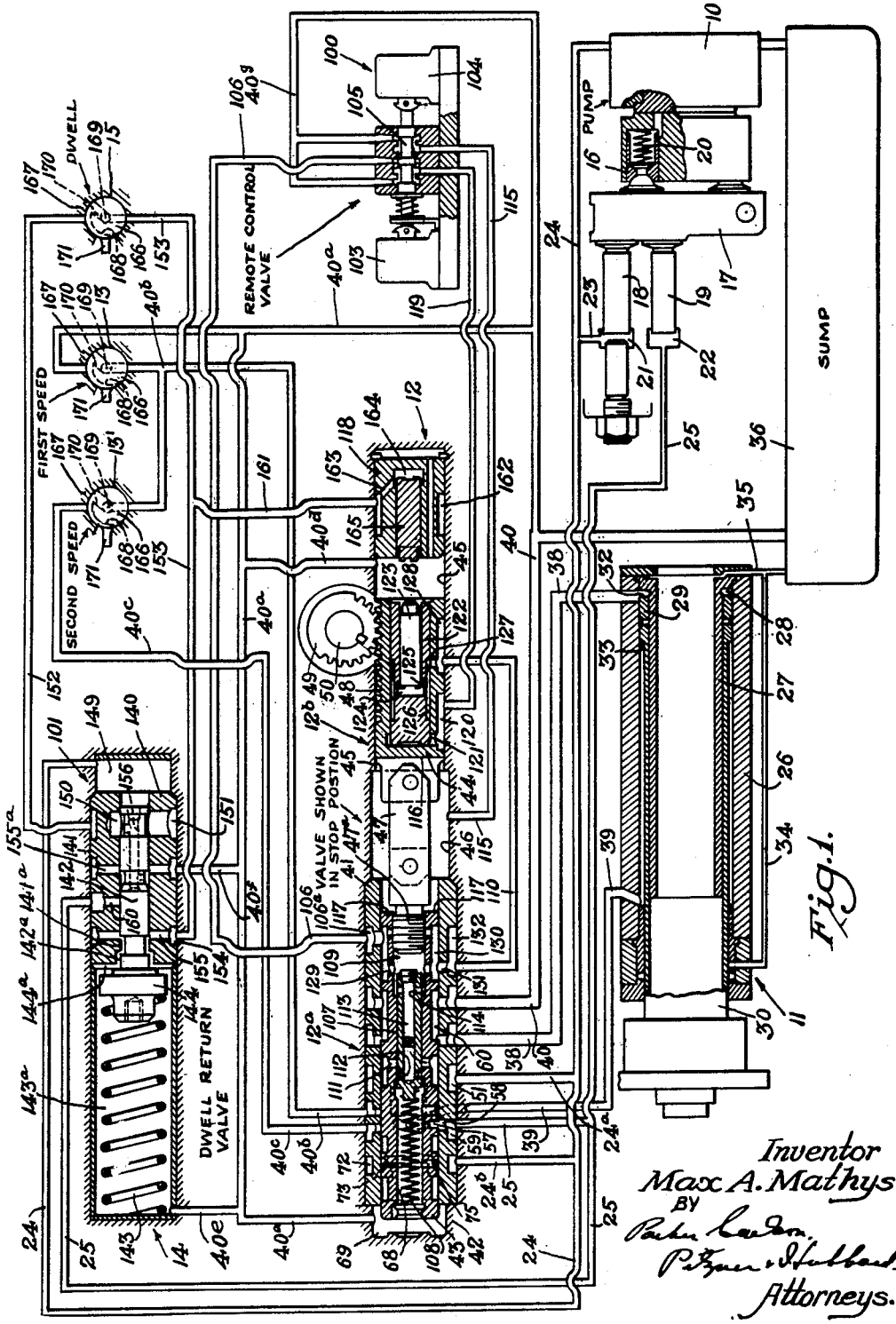
Figure 1 is a diagrammatic view of the improved system.

Figs. 5 to 10, inclusive, are transverse sectional views through the valve sleeve taken respectively in the plane of lines 5—5, 6—6, 7—7, 8—8, 9—9 and 10—10, in each of Figs. 2 and 3.

Figs. 11 to 14, inclusive, are transverse sectional views through the valve member taken respectively along lines 11—11, 12—12, 13—13 and 14—14 of Fig. 4.

Figs. 15 to 18, inclusive, are fragmentary vertical sectional views through the valve with the valve member shown in elevation and respectively shown in rapid forward, first feed, second feed and rapid reverse positions.

Fig. 19 is a fragmentary longitudinal plan section through the control and operating sections of the valve in the stop position thereof.

Fig. 20 is a fragmentary longitudinal vertical section through the dwell return valve.

Fig. 21 is a fragmentary longitudinal sectional view illustrating a dog bar mechanism for shifting the main valve automatically in the travel of a tool spindle with which the hydraulic actuator is coupled.

Fig. 22 is a fragmentary transverse sectional view taken approximately in the plane of line 22—22 of Fig. 21.

In general

Referring first to Fig. 1, the improved system comprises in general a variable delivery motor driven pump 10 supplying pressure to a hydraulic actuator 11 under the control of a main valve 12, feed control orifices 13 and 13' and a combination dwell and emergency return valve 14 with a cooperating orifice 15. The pump is preferably of the type disclosed in my said copending application. It comprises briefly a plurality of parallel annularly spaced piston and cylinder units 16 operatively associated with a pivoted swash plate 17, the angular position of which governs the rate of discharge of the pump. The swash plate is arranged for automatic control by means of a balancing plunger 18 and a control plunger 19, both adapted to act upon the free end of the swash plate 17 in a direction to level off the pump against the hydraulic reaction of the cylinder units 16 and the action of their return springs 20. The balancing and control plungers 18 and 19 are respectively operated in pressure chambers 21 and 22, which, while shown in Fig. 1 one above the other, are actually disposed one behind the other and hence the same distance from the pivotal support. The former is connected by a branch line 23 to the pressure line 24 of the pump while the control chamber 22 is connected to a control line 25. When the latter is connected to exhaust, the springs 20 act to shift the swash plate into a position of maximum inclination and therefore maximum fluid delivery. As fully set forth in my said copending application, the rate of delivery of the pump, and therefore the feed rate of the actuator is automatically adjusted under orifice control by utilizing varying back pressures set up in said control line 25. In the present instance, such control is effected by cutting in and out selectively the speed control orifices 13 and 13' through the operation of the main valve.

As herein shown, the hydraulic actuator 11 is of the differential type and comprises outer and inner cylinder members 26 and 27 secured together in spaced concentric relation so as to form an annular piston chamber 28. The piston is formed by a radial enlargement 29 on the rear end of a sleeve 30 constituting a quill for supporting a tool spindle for axial translation as well as rotational movement. It will be observed that the rear end of the piston 29 provides a pressure area 32 substantially larger than (herein twice) the forward pressure area 33. Any fluid escaping by leakage from either end of the piston chamber may pass to the reservoir or sump 36 through drain lines 34 and 35.

Under the control of the main valve 12, fluid under pressure is delivered by the pump 10 through the delivery or pressure line 24 and one or more supply lines 38 and 39 respectively leading to the opposite ends of the piston chamber 28; also fluid discharging from either end of the cylinder is directed, under the control of the valve, through an exhaust line 40 to the sump 36. Additionally, the valve 12 is utilized in accordance with the present invention during the forward feeding movement of the actuator to introduce exhaust fluid to the feed control orifices 13 and 13' adapted to meter the exhaust fluid in varying degrees for the purpose of varying the back pressure in the control line 25 and thereby governing the rate of delivery of the pump.

In accordance with the present invention, the valve 12 is of the reciprocatory type. In general, it is composed of a control section 12a and an operating section 12b. The control section comprises a sleeve or casing 41 fixed in a suitable housing 42, and a valve member 43 of tubular form shiftable axially in the sleeve or casing 41 into any one of five different positions. The operating section comprises a cup-shaped member 44 shiftable in a bore 45 which is axialy alined with the valve sleeve 41, but spaced therefrom by an intermediate chamber 46. The member 44 is connected by means of a link 47 with the control valve member 43 through a stud 47a threaded into the end of the valve 43 and constituting a plug therefor. The member 44 has a rack 48 on one side, and this rack meshes with a pinion 49 on a rock shaft 50 arranged for actuation manually or automatically in the reciprocation of the part being actuated, namely, the tool spindle.

Valve positions

In Fig. 1 the valve is shown in its stop position. From this position it is shifted into its extreme right-hand position to initiate an operating cycle. This is accomplished by manually turning the rock shaft 50 counterclockwise or, alternatively, by a remote control device in a manner hereinafter set forth.

*Stop position.*—In the stop position of the valve (Figs. 1 and 2) the actuator piston is in its retracted position and branch 24a of pressure line 24 is connected by the valve directly to pump control line 25 so as to hold swash plate 17 in its vertical or non-pumping position. To establish such a connection between branch line 24a and pump control line 25, the valve sleeve 41 has an annular groove 51 which connects through milled slots 52 (Figs. 3 and 19) in diametrically opposite sides of the sleeve with longitudinal passages 53 formed between flat sides 54 of the valve member and the inner cylindrical surface of the sleeve. At their forward ends the passages 53 are connected by a small diagonal passage 55 (Figs. 2 and 4) in a land 56 of the valve member to a milled slot 57 in the bottom of said land 56. The slot 57 registers with a port 58 communicating with a groove 59 in the bottom of the valve sleeve into which groove enters the pump control line 25.

Rear cylinder line 38 is connected in this stop position of the valve, to exhaust. As shown in Fig. 2, the valve member forms an annular chamber 60 between land 61 and 62, and into this chamber enter two sets (four each) of ports 63 and 63a, respectively communicating with annular grooves 64 and 64a for connection with the rear cylinder line 38 and exhaust line 40.

The forward cylinder line 39 is cut off by the valve. This line is disposed in the same transverse plane as pump control line 25, but for purposes of illustration it is shown in Figs. 1, 2, and 15 to 18, inclusive, as offset laterally a short distance to the right of line 25. It connects with grooves 65 at the remote side of the valve sleeve (Figs. 6 and 19) and ports 66 which at this time are covered by the land 56 of the valve.

*Rapid transverse forward.*—From the stop position, the valve is shifted into its extreme right-hand position (Fig. 15) to initiate a cycle. In this position, fluid under pressure is delivered from pressure line 24 to both of the cylinder lines 38 and 39, causing the actuator to move forwardly at a rate determined by the differential between the two pressure areas 32 and 33 of the actuator and by the adjustment of the pump. At this time, the latter occupies its maximum delivery position.

To connect branch line 24ª with cylinder line 38, line 24ª enters annular groove 51 through the two slots 52 in opposite sides of the valve sleeve, which slots in turn communicate with the longitudinal passages 53 formed by the sides of the valve members; and these longitudinal passages 53 communicate through the opposite milled slots 63 in the sleeve with an annular groove 64 into which leads rear cylinder line 38. In a similar manner branch pressure line 24ᵇ is connected to forward cylinder line 39. Thus line 24ᵇ opens into an annular groove 72 and the latter connects by opposite milled slots 73 with longitudinal passages 74 (Fig. 19) formed between flat sides of the valve member and the valve sleeve near the forward end of the valve; and passages 74 in turn connect through opposite milled slots 66 in the sleeve with the grooves 65 into which enters front cylinder line 39. To adjust the pump to its maximum rate of discharge during forward rapid traverse, pump control line 25 is connected to exhaust through a radial port 75 (Fig. 11) extending vertically through a land 76 near the forward end of the valve member and through bore 68 to exhaust chamber 69. It will be observed that in the case of forward rapid traverse there is no return flow of fluid to the sump 36.

*First feed forward.*—With the valve 12 moved one step to the left (Fig. 16), the pressure line 24 remains connected with the rear pressure area 32 of the piston through branch line 24ª and rear cylinder line 38. Forward cylinder line 39, however, is connected by the valve to a line 40ᵇ leading to the first feed orifice 13; and the pressure set up in this line 40ᵇ as determined by the setting of the orifice is transmitted to the control line 25 to decrease the rate of delivery of the pump and therefore the speed of the actuator to the rate predetermined for first feed.

The connection between the branch pressure line 24ª and the rear cylinder line 38 remains the same as in the case of rapid traverse forward and need not be repeated. Forward cylinder line 39 is connected through grooves 65, slots 66 and an annular valve chamber 77 with slot 77ª and groove 77ᵇ orifice pressure control lines 40ᵇ and 40ᶜ. The latter contains the second feed orifice 13', but being in shunt relation to orifice line 40ᵇ, is ineffective. Orifice 13 provides an adjustable restriction in a manner hereinafter described, its discharge side being connected (Fig. 1) to exhaust branch line 40ª. Pump control line 25 is connected by groove 59 and slot 58 with the annular valve chamber 77 so that the pressure set up in orifice control line 40ᵇ is transmitted to pump plunger 19, thereby reducing the delivery of the pump to the desired rate. To avoid any danger of high pressure leaking past land 56 to the pump control line, said land has small grooves 67 therein connected by radial holes 67ª to the bore 68 of the valve member, the latter being at all times in communication with an exhaust chamber 69 connected with branch exhaust line 40ª.

*Second feed forward.*—As shown in Fig. 17, the valve has been shifted through its second step to the left. It will be observed that simultaneously with the connection made by the valve with the line 40ᵇ in the previous shift of the valve into its first feed position, another connection was made to a shunt or branch line 40ᶜ containing the second feed orifice 13' and leading to the line 40ᵇ. When now the valve 12 is shifted into its second forward feed position, the connection between forward cylinder line 39 and line 40ᵇ is broken by valve land 56 but is maintained as to the branch line 40ᶜ. Although orifice 13' is now placed in series with orifice 13, the former being the more restricted becomes principally effective to determine the pressure in pump control line 25 and therefore the degree of adjustment of the pump. It will be noted that in this position of the valve, line 40ᶜ remains connected with pump control line 25 (Fig. 6) through groove 77ᵈ, slot 77ᶜ, annular channel 77, slot 58, and groove 59; and pressure line 24ª remains connected as before to rear cylinder line 38.

*Rapid traverse return.*—For this purpose the valve 12 is shifted into its extreme left-hand position, as shown in Fig. 18. In this case, front cylinder line 39 is connected to branch pressure line 24ª through slots 66, grooves 65, passages 53, slots 52 and annular groove 51. Rear cylinder line 38 is connected to the exhaust line 40 by annular grooves 64 and 64ª, slots 63 and 63ª, and annular chamber 60. Also pump control line 25 is connected to the exhaust so that the pressure upon the control plunger 19 is reduced to the minimum and the pump correspondingly adjusted to its maximum delivery position. This is effected through a drilled hole 56ª (Figs. 4 and 13) registering at its lower end with milled slot 58 opening into bottom groove 59 into which the line 25 enters.

Valve actuation

Referring now to the operating section 12ᵇ of the valve structure (Fig. 1), the actuating shaft 50 is mounted transversely of the housing forming the valve casing 43. On one end of this shaft (Fig. 22) is a hand knob 80 by means of which the shaft may be turned manually when desired. For automatic operation in the reciprocation of the tool spindle, the shaft carries an abutment member 81 enclosed within a recess 82 in the housing and providing a plurality of shoulders for engagement by a series of dogs on a dog bar 83 (Fig. 22). This bar is slidably supported in a bore 84 extending lengthwise of the housing parallel to the tool spindle, the forward end of the bar being connected to a radial flange 85 on the quill 30 slidably supporting a tool spindle 87.

The bore 84 in which the dog bar 83 is supported opens outwardly from the housing so as to expose the dog bar upon which is mounted for successive cooperation with the abutment member 81 a series of dogs including a stop dog 88, a first feed dog 89, a second feed dog 90 and a reverse dog 91. The abutment member 81 has two shoulders 92 and 93 facing generally rearward for cooperation with the feed and reverse dogs 89, 90 and 91 and a single forwardly facing shoulder 94 for cooperation with the stop dog. The feed dogs are disposed in the same vertical plane for cooperation with the shoulder 92, but the second feed dog is higher than the first so as to be capable of continuing the motion of the rock shaft to impart a full stepping movement to the valve. As shown in Fig. 22, the reverse and stop dogs are disposed in planes on opposite sides of the feed dogs for cooperation with the shoulders 93 and 94 respectively.

As above indicated, in initiating a cycle, assuming the parts to be in stop position (Figs. 1 and 21), a rotational movement is imparted to the shaft 50 in a counterclockwise direction and valve member 43 shifted into its extreme right-hand or rapid forward position. At the end of the rapid approach movement, the abutment member 81 is engaged by first feed dog 89 striking shoulder 92, and at the end of the first feed, by dog 90 striking shoulder 92 and causing it to impart to the valve member its second stepping movement to the left. Then at the end of the second feeding movement, reverse dog 91 engages shoulder 93 to shift the valve through a third stepping movement and toward the stop position of the valve. However, as will be presently described, the valve does not remain in this position but is shifted hydraulically into its extreme left-hand or rapid return position. It is held in this position hydraulically until at the end of the return stroke, stop dog 88 engages shoulder 94 of the abutment member 81 and shifts and holds the valve in its stop position.

Remote control

In addition to being actuated mechanically by the rock shaft 50 of the dog bar mechanism, the operating section 12$^b$ of the valve is arranged for actuation hydraulically by a remote control device generally designated 100 for the purpose of initiating a cycle, or for purposes of emergency control; and also by a combined dwell and emergency return valve 101 in cooperation with the dwell orifice 15. In addition, the operating section of the valve is arranged for actuation hydraulically as an incident to the movement of the valve member 43 into stop position by the reverse dog 91 in the normal machining cycle for the purpose of completing the movement automatically into rapid return position.

The remote control device 100 is per se of the general character set forth in my said copending application Serial No. 379,211, now Patent No. 2,416,339. It comprises briefly two solenoids 103 and 104, operatively connected with a valve member 105 and normally occupying a central or neutral position. Fluid is supplied to the valve at a constant pressure reduced substantially from the pressure in pump supply line 24 through a line 106 connected to slot 106$^a$ and port 106$^b$ in the valve sleeve. For this purpose, an automatic pressure regulating valve is provided.

For the sake of simplicity in construction, the pressure regulating valve is embodied in the main valve member 43. It comprises an elongated hollow member 107, urged by a compression spring 108 to the right in Figs. 1 and 19 against the action of fluid under pressure contained in a chamber 109 at the right-hand end of the valve 43.

In the stop position of the valve, shown in Figs. 1 and 19, and also in the rapid reverse position (Fig. 18) the chamber 109 is connected to a duct 110 for the purpose of actuating the valve into or holding it in rapid reverse position as will be described presently. In all other positions the line 110 is connected through the annular chamber 60 of the valve member to exhaust.

The pressure in the chamber 109 is maintained substantially constant, being supplied according to the tension of spring 108 on the valve member 107 with fluid under pressure from the main pressure line 24 in all positions of the valve 43. For this purpose, the valve is provided on opposite sides with holes 111 (Figs. 14 and 19) for the transmission of pressure from passages 53 which communicate in all valve positions with the branch pressure line 24$^a$ through the annular channel 51 and slots 52.

In Fig. 1, which is diagrammatic in character, the holes 111 are shown as being in a vertical plane merely for purposes of illustration, these holes being preferably disposed horizontally as shown, for example, in Figs. 14, and 15 to 19. With particular reference to Fig. 19, the holes 111 are adapted to communicate with the interior of the tubular regulating valve 107 according to the position occupied by the latter as determined by the pressure in the chamber 109 and the tension of the spring 108. Thus, as the pressure in this chamber falls, the spring 108 shifts the valve 107 to the right to carry an annular groove 112$^a$ into registry with the holes 111 in the main valve member 43. From groove 112$^a$ fluid under high pressure passes through holes 112 to a central axial bore 113 communicating at its opposite end with the chamber 109 through radial ports 114. On the other hand, when the pressure in the chamber 109 exceeds a predetermined value, the regulating valve is shifted to the left until the groove 112$^a$ communicates with the recess 112$^b$ in the interior of the main valve bore which is at all times connected to exhaust through branch line 40$^a$. It will thus be seen that a reduced substantially constant pressure is available at all times in remote control line 106 for utilization in the hydraulic actuation of the valve in the remote control device 100 according to the energization of the solenoids 103 and 104.

To initiate an operating cycle by means of the remote control device 100, the solenoid 103 is energized as by means of a start button in the customary electrical control circuit (not shown). This causes a shifting of the valve 105 a short distance to the left so as to connect pressure line 106 with a duct 115 leading to the chamber 46 intermediate the two sections of the main valve. It will be observed that the pressure area 116 formed by the left-hand end of the rack member 44 is relatively larger than the pressure area 117 formed by the right-hand end of the main valve member 43. Accordingly, the introduction of fluid under pressure to the chamber 46 causes the rack member 44 to shift to its extreme right-hand or rapid forward position, such position being determined in the present instance by the engagement of the rack member with a sleeve 118 secured in the right-hand end of the bore 45 and forming part of the dwell return mechanism to be later described. Thereafter, the machining cycle is completed in the manner above set forth.

Energization of the opposite solenoid 104 effects an emergency return of the actuator by shifting the main control valve 105 into its rapid reverse position. In this instance, the remote control valve 105 effects a connection between the pressure line 106 and a duct 119 opening in all positions of the rack member 44 into a channel 120 extending longitudinally in the bottom of the rack member 44. From the channel 120 fluid is admitted through a port 121 to the interior of the rack member for application to the left end of a plunger 122 to shift it to the right until it engages with the sleeve 118 and thereupon to shift the rack member to the left. The bore 45 being connected by 40$^d$ to the exhaust branch line 40$^a$ at a point between the rack member 44 and the sleeve 118, the plunger 122 makes its initial shift to the right rapidly. Consequently, the main valve member is shifted into its rapid return position substantially instantaneously following the energization of the solenoid 104.

When the solenoid valve 105 is shifted into either of its operative positions, one or the other of the lines 115 and 119 is connected by the valve to exhaust line 40ᵉ according to which is not being used for the conduction of fluid under pressure. At the central neutral position of the solenoid valve, lines 119 and 115 are connected to exhaust.

The hydraulic actuation of the main valve as an incident to its movement from second feed to stop position to carry the valve member 43 into rapid return position after the valve has been moved by the reverse dog in the manner above set forth, is accomplished by a small or second plunger 123 slidable axially in a bore 124 of the plunger 122. The bore 124 forms a pressure chamber at the left-hand end of the plunger 123, which chamber is connected by a port 125, an elongated annular recess 126, a registering port 127 and a longitudinal groove 128, with the duct 110 to which fluid under pressure is supplied as an incident to the movement of the main valve 43 toward its stop position.

As above indicated, in the stop and rapid return positions of the valve 43, the chamber 109, which is maintained at reduced constant pressure by the regulating valve 107, is connected to the duct 110. For this purpose, the chamber 109 has opposite outlet ports 129 formed in the main valve member 43 and connecting with an annular chamber 130. The latter in turn connects through a port 131 in the valve sleeve 141 with a longitudinal channel 132 in the bottom of the sleeve, the duct 110 opening into said channel 132.

It will be seen that when the valve member 43 is shifted out of the second feed position by the reverse dog 90, fluid under pressure from the chamber 109 passes through 129, 130, 131, and 132 to duct 110 for transmission to pressure chamber 124 through 125, 126, 127 and 128. As a result, inner plunger 123 is first shifted to its extreme right-hand position and then the plunger 122 and rack member 44 shifted as a unit to the left, forcing the main valve member 43 into its rapid return position. In this position, the pressure in chamber 124 of the operating section of the valve is continued so that the valve 43 is held in its rapid return position until forced to the stop position in the return movement of the actuator by the action of the stop dog 88 engaging with shoulder 94 of the abutment member 81.

*Combined dwell and emergency return control*

This mechanism constitutes an important feature of my invention. It is coordinated with the operating mechanism 12ᵇ of the mechanism to actuate the control section 12ᵃ as determined by the control valve 101 and the setting of the dwell control orifice 15.

Referring now to Figs. 1 and 20, the dwell return valve comprises a valve sleeve 140 fixed in a suitable housing 141, and having slidable within an axial bore 141ᵃ a control valve member 142. The latter is forced to the right by means of a compression spring 143 acting between a head 144 rigid with the valve member and a stop member 145. The head 144 serves to limit the movement of the valve member to the right, and the member 145 is adjustable to vary the pressure of the spring. Any suitable construction may be employed for this purpose. Herein the member 145 (Fig. 20) is slidable axially within a bore 146 and carries an adjusting stop screw 147 for engagement with a plug 148, screw threaded into the end of the sleeve.

The dwell valve is subjected to the pressure delivered by the pump and applied to the actuator during feed. Its function in general is to adjust the output of the pump in accordance with the pressures developed under various abnormal operating conditions, or in the case of the interposition of a positive stop for dwell purposes. It may also function to effect an automatic return of the actuator, and, in the case of an interposed stop for dwell purposes, to effect such return after a predetermined time interval.

In the first and second feed positions of the valve, pressure line 24 is of course connected to the rear pressure area 32 of the actuator. Accordingly, the pressure in this line, varying in accordance with the different operating conditions encountered such as dull tools, hard spots in the work, etc., or by engagement with a positive stop, is transmitted to the dwell return valve 101 by the line 24 which opens into a pressure chamber 149 at the right-hand of the sleeve 140 and its valve member 142. As the pressure in this chamber increases sufficiently to overcome the pressure of the spring 143, a port 150 in the sleeve 140 is uncovered, said port opening into an annular groove 151 which is connected by a duct 152 to the entering side of dwell orifice 15, the discharge side of said orifice being connected by a duct 153 leading back to the dwell valve 101. At this valve the duct 153 enters an annular groove 154 connected by radial ports 155 with the bore 141ᵃ for valve member 142, and the arrangement is such that as the valve member is shifted to the left against the action of the spring, the ports 155 are cut off as well as ports 155ᵃ connected by a duct 40ᶠ to the exhaust line 40ᵃ. These ports are cut off immediately before uncovering of port 150. In addition, such movement of the valve to the left effects a gradual connection between the pump control line 25 and the pressure chamber 149. For this purpose the valve member 142 has an axial bore 156 (Fig. 20) one end of which is connected by ports 157 and an annular groove 158 to the port 150. The other end is connected by a port 158ᵃ and an annular groove 159 with a port 160 to which the pump control line 25 is connected. At the left side of the groove 159 the valve member is tapered slightly so as to open the port 160 gradually.

Summarizing, as the pressure in the main pressure line 24 increases as a result of the operating conditions encountered, the valve 142 is shifted to the left against the action of the spring 143 to discharge high pressure fluid through the duct 152 and dwell orifice 15; discharge line 153 is cut off by the valve at port 155; and pressure is delivered through 158, 157, 156, 158ᵃ, 159 and 160 to pump control line 25.

If dwell orifice 15 is in open position, as is the case when no dwell of the actuator is desired, fluid under pressure is utilized to effect actuation of the main valve into its rapid return position. To this end, line 153, leading from dwell orifice 15 is connected by a branch line 161 to the extreme right end of the bore 45 of the operating section 12ᵇ of the main valve. The fixed sleeve 118 in said bore has an annular recess 162 into which enters the branch line 161; and from this recess a diagonal passage 163 leads to a pressure chamber 164 formed at the right-hand end of the sleeve, for application to a small axially slidable plunger 165. At the left of the sleeve 118 the bore 45 is connected by a branch duct 40ᵈ with exhaust line 40ᵃ. It will be seen that when the dwell orifice 15 is in open position, high pressure fluid delivered to the pressure chamber 164 imparts a rapid movement to the small plunger 165 to the left and acts through alined plunger 123 and valve member 122 to shift the rack member 44 to the left and with it the main valve member 43. The plunger 165 shifts the valve assembly 12 to the left until the pressure connection into duct 110 is established (Fig. 2), whereupon the valve is shifted hydraulically to its extreme left-hand or rapid return position. On the other hand, by restricting the dwell orifice 15, a timed delay in effecting the return of the actuator may be effected, the extent of such delay being dependent upon the degree of restriction. In an extreme case, if the orifice 15 should be closed entirely, the valve actuating plunger 165 would be wholly ineffective to cause a return movement of the actuator. It is to be observed, however, that should this occur, the control line 25 being connected with the high pressure source present in the chamber 149 would automatically cause an adjustment of the pump so as to reduce the volume discharged thereby to an amount sufficient only to maintain the pressure determined by the spring 143.

It will be observed that the time of dwell is adjusted by the setting of the orifice 15; and the maximum feeding pressure, which is identical with the dwell return pressure, is determined by the setting of the adjusting screw 147.

When the plunger 165 is returned to the right, fluid is permitted to escape through branch line 161, duct 153 and the ports 155 to the exhaust line 40; ports 155 being normally connected to exhaust through the left end of bore 141$^d$, counterbore 142$^a$, radial groove 144$^a$, chamber 143$^a$, and duct 40$^e$.

Also it will be seen that in the right or closed position of plunger 142 no leak from the pressure line 24 into the pump control line 25 is possible. This is prevented by arranging the radial ports 155 and 155$^a$ on opposite sides of pump control line port 160, the ports 155 and 155$^a$ being both normally connected to exhaust.

The orifice control valves 13, 13' and 15 may be of any suitable or preferred construction. They are herein shown only schematically in Fig. 1. Each comprises a cylindrical plug 166 rotatable in a housing 167 containing inlet and outlet ports respectively communicating with a circumferential groove 168 and an axial passage 169. Groove 168 is made of gradually increasing depth and is connected at its deep end with the axial passage 169 by a radial port 170. The plugs are adapted to be rotated manually, being equipped for this purpose with a simple handle 171.

*Summary of operation.*—From the stop position shown in Fig. 1, the valve member 43 is shifted either by imparting a rotational movement to the rock shaft 50 manually or by the depression of a start button to energize solenoid 103 of the remote control device. In the case of the manual operation, the rock shaft is turned in a counterclockwise direction (Fig. 1); and, if the operation is initiated by energization of the solenoid, fluid under reduced substantially constant pressure is supplied from chamber 109 in the main control valve to chamber 46 of the main valve through ducts 106 and 115. Since the pressure area 116 of the rack member 44 is relatively larger than the opposing area 117 of valve member 143, rack member 44 is shifted to the right until stopped by the sleeve 118.

The valve member 43 below now in its rapid traverse forward position (Fig. 15), fluid is delivered by the pump simultaneously to the rear and front cylinder lines 38 and 39 and the pump control line connected with exhaust so that the swash plate 17 of the pump shifts by the action of springs 20 into its maximum delivery position. Branch pressure line 24$^a$ is connected by the valve member 43 to rear cylinder line 38 through groove 51, slots 52, passages 53, slots 63, and groove 64; and pressure line 24$^b$ is connected to forward cylinder line 39 through groove 72, slots 73, passages 74, slots 66 and grooves 65. Pump control line 25 is connected to exhaust through groove 59, slot 58, port 75, axial valve bore 68, and exhaust chamber 69. The pump accordingly operates at maximum delivery rate and the actuator moves forward at a rapid traverse rate determined by the differential in the rear and forward pressure areas 32 and 33 of the actuator.

From its extreme right-hand position, the valve 43 is shifted one step to the left (Fig. 16) by first feed dog 89, engaging with shoulder 92 of abutment member 81 on rock shaft 50. The connection between pressure branch line 24$^a$ through the rear cylinder line 38 continues as before; but front cylinder line 39 is now connected to orifice controlled line 40$^b$ containing first feed orifice 13, and pump control line 25 is subjected to the pressure in line 40$^b$ determined by the setting of the orifice 13. The connection from the cylinder line 39 to orifice controlled line 40$^b$ is through grooves 65, slots 66, channel 77, slot 77$^a$ and groove 77$^b$. Pump control line 25 is connected to annular channel 77, through groove 59 and slot 58. The pressure thus transmitted to pump control plunger 19 effects an adjustment of swash plate 17 against the action of springs 20 to reduce the delivery rate of the pump as predetermined for first feed.

Fig. 17 shows the valve 43 shifted another step to the left by the second feed dog 90 engaging with shoulder 92. Here again, the connection between rear cylinder line 38 and branch pressure line 24$^a$ is continued. Likewise, the connection between line 40$^c$ and pump control line 25 remains, through groove 77$^d$, slot 77$^c$, annular valve channel 77, slot 58, and groove 59. However, front cylinder line 39 is now connected only to orifice controlled line 40$^c$ containing second feed orifice 13', line 40$^b$ being blocked off by the valve so that the two orifices are now in series. Since orifice 13' is more restricted than 13, the former is effective to reduce the feed rate of the actuator through a further adjustment of the pump.

Upon the completion of the second feeding movement, reverse dog 91 engages shoulder 93 and shifts the valve member 43 toward stop position. As an incident to movement of the valve out of its second feed position and when land 62 uncovers port 131, hydraulic pressure is delivered to the operating section 12$^b$ of the valve mechanism and it causes the valve member to shift into its extreme left-hand or rapid traverse position. In this operation, pressure is delivered from constant pressure chamber 109 in the control valve through ports 129, annular chamber 130, port 131, and longitudinal channel 132 to duct 110 and thence to pressure chamber 124, through channel 128, port 127, recess 126, and port 125. As a result, inner plunger 123 is shifted to the right into engagement with its alined plunger 165 whereupon rack member 44 is shifted to the left through the medium of plunger 122.

With the valve in its extreme left-hand position (Fig. 18), rear cylinder line 38 is connected to exhaust, front cylinder line 39 connected to branch pressure line 24ª, and pump control line 25 connected to exhaust so as to effect maximum pump delivery. Line 38 is connected to exhaust through groove 64, slots 63, channel 60, slots 63ª and groove 64ª. The connection between forward cylinder line 39 and pressure line 24ª is through grooves 65, slots 66, passages 53, slots 52, and groove 51. Pump control line 25 is connected to exhaust through groove 59, slot 58 and drilled hole 56ª.

The actuator now having been reversed, stop dog 88 engages shoulder 94 and shifts valve member 43 one step to the right or into its stop position. In this case, the front cylinder line is blocked off and the rear line is connected to exhaust, and pressure line 24ª is connected to pump control line 25 to shift the swash plate 17 into its vertical or non-pumping position. Connection between lines 24ª and 25 is through groove 51, slots 52, passages 53, diagonal port 55, groove 57, in the valve member, slot 58 and groove 59.

It will be observed that the rate of travel of the actuator during feed is determined by the setting of the orifices 13 and 13'. Thus the orifices are rendered operative selectively under the control of the first and second feed dogs to adjust the rate of delivery of the pump and therefore the rate of travel of the actuator. However, if during feed abnormal resistance to the movement of the tool by the actuator should be encountered as, for example, engagement of the tool with a hard spot in the work, pressure line 24, being connected to rear cylinder line 38, will transmit any increased pressure resulting from the added resistance to pressure chamber 149 of the dwell return valve device 101. This will cause valve member 142 to shift to the left so as to direct a controlled quantity of fluid under high pressure to pump control line 25 whereby to reduce the output of the pump. The connection for this purpose is through port 150, groove 158 (Fig. 20), ports 157, bore 156, port 158ª, groove 159, and port 160. The result is that the delivery rate of the pump is immediately reduced. A similar result obtains if a stop is intentionally interposed in the path of the actuator for dwell purposes.

When pressure in chamber 149 increases so as to effect an adjustment of the pump, such increase in pressure may also become effective to institute a return movement of the actuator by connecting the chamber 149 with pressure chamber 164 in the valve operating section of the main valve mechanism. This occurs under the control of dwell orifice 15 through port 150, duct 152, orifice 15, duct 161, recess 162 and diagonal port 163. Movement of the plunger 165 to the left acts through alined plunger 123, plunger 122, rack member 44, and link 47 to shift the main valve 43 toward stop position whereupon the valve is shifted hydraulically into its rapid return position, as in the normal operation, causing a reversal of the actuator until stop dog 93 engages shoulder 94 forcing the valve into its stop position.

The automatic return of the actuator as above described will occur in quick response to a building up of pressure in the chamber 149 of the dwell return valve, assuming that the dwell orifice 15 is in open position so as to offer no substantial restriction to the passage of fluid from the chamber 149 to the chamber 164. However, when desired, a dwell of varying duration in the travel of the actuator, may be produced by adjusting the orifice 15, the length of dwell varying according to the degree of the restriction interposed by the orifice. If the orifice is completely closed, the delivery of fluid to the actuating chamber 164 will be cut off entirely, rendering this mechanism ineffective to cause a return movement of the actuator. When, however, the orifice is adjusted to permit the passage of fluid therethrough, it will flow gradually into pressure chamber 164 and after a predetermined time delay will actuate the plunger 165 and cause the main valve to be shifted into its rapid return position. It will of course be understood that when a dwell at the end of the second feed is desired the reverse dog 88 must first be moved out of range of the abutment member.

It will be seen that I have by my invention provided a hydraulic control system of improved construction and mode of operation. The manner of shifting the main valve is especially important from the standpoint of simplicity and reliability, the use of latches, load and fire devices, and the like being entirely eliminated.

The use of a plurality of feed control orifices to obtain different feed rates automatically is also advantageous. Especially to be noted is the fact that each of the orifices effects a change in the rate of movement of the actuator by adjusting the pump so that it will deliver only that volume of fluid which is required.

Of primary importance is the automatic adjustment of the pump to reduce its output when the feeding pressure exceeds a predetermined maximum. Even when the movement of the actuator is positively interrupted as by the deliberate interposition of a dwell stop, or in the case of a dull or broken tool, the dwell valve operates to reduce the output of the pump to that required to compensate for leakage, etc. Thus it is possible to maintain the actuator under high pressure during dwell without undue power consumption or excessive heating of the oil.

I claim as my invention:

1. A hydraulic control system for machine tools and the like comprising, in combination, an actuator including a cylinder and piston, a variable delivery pump having a pressure responsive control device and a control line leading thereto, a sump, pressure and exhaust lines leading from the pump and to the sump respectively, a plurality of fluid lines connected to said exhaust line and each having an adjustable control orifice therein, said orifices having different flow restrictions interposed respectively in said fluid lines, and valve means controlling the delivery of fluid from said pressure line to said actuator and from the discharge side of said actuator to said pump control line, said valve means having a plurality of feed positions and being operative in each such position to establish a connection leading from said actuator to a selected one of said orifice controlled lines, said orifices being operative to build up pressure in said control line so as to vary the pump discharge as determined by the particular orifice which is connected to said actuator.

2. A hydraulic control system for machine tools and the like comprising, in combination, an actuator including a cylinder and a piston, a variable delivery pump, a sump, pressure and exhaust lines leading from the pump and to the sump respectively, and valve controlled means governing the delivery of fluid from said pressure line to the actuator and from said actuator to said exhaust line, said means including a main valve having a plurality of feed positions, and a plurality of control devices respectively operative in the different feed positions of the main valve to meter the discharge of fluid from the actuator to said exhaust line and thereby to set up different pressures in said line, said pump having adjusting means responsive to the varying pressures set up by the different control devices to vary the delivery volume of the pump.

3. A hydraulic control system for machine tools and the like comprising, in combination, an actuator including a cylinder and a piston, a variable delivery pump, a sump, pressure and exhaust lines leading from the pump and the sump respectively, valve controlled means effecting the delivery of fluid from said pressure line to said actuator and from the actuator to said exhaust line, said means including an axially movable valve member shiftable with a step-by-step movement into rapid approach and first and second feed positions successively, said means further including control devices operative selectively when said main valve is in its respective feed positions to meter the discharge of fluid from the actuator to said exhaust line and thereby set up different pressures in said line, and said pump having adjusting means responsive to the varying pressures set up by said control devices to vary the delivery volume of said pump.

4. A hydraulic control system for machine tools and the like comprising, in combination, an actuator including a cylinder and a piston, a variable delivery pump, a sump, pressure and exhaust lines leading from the pump and the sump respectively, valve controlled means effecting the delivery of fluid from said pressure line to said actuator and from the actuator to said exhaust line, said means including an axially movable valve member shiftable with a step-by-step movement into approach, feed, stop and rapid return positions, successively, said means further including a control device operative when said valve member is in feed position to effect a reduction in the delivery volume of said pump, and fluid pressure means operative as an incident to the movement of said valve member into stop position to shift it into its rapid return position.

5. A hydraulic control system for machine tools and the like comprising, in combination, an actuator including a cylinder and a piston, a variable delivery pump, a sump, pressure and exhaust lines leading from the pump and the sump respectively, valve controlled means effecting the delivery of fluid from said pressure line to said actuator and from the actuator to said exhaust line, said means including an axially movable valve member shiftable with a step-by-step movement unidirectionally from rapid approach, feed, stop and rapid return positions, and including control means operable when said valve member is in feed position to effect a reduction in the delivery volume of said pump, means operative in timed relation to the movements of the actuator to shift said valve member from rapid approach to feed and stop positions successively, and fluid pressure operated means operative as an incident to the movement of said valve member into stop position to shift it into its rapid return position.

6. A hydraulic control system for machine tools and the like comprising, in combination, an actuator including a cylinder and piston, a pump, a sump, valve means controlling the flow of fluid to and from said actuator so as to impart rapid approach, feed, and return movements to the actuator, said valve means including a valve member movable unidirectionally with a step-by-step motion in a sequence of steps from rapid approach to feed, stop and rapid return positions, and including means operable upon movement of said valve member into feed position to effect reduced delivery of fluid to said actuator, and fluid pressure actuated means for said valve member operative as an incident to the movement of the member into said stop position to shift it into the return position.

7. A hydraulic control system for machine tools and the like comprising, in combination, an actuator including a cylinder and piston, a pump, valve means controlling the flow of fluid to and from said actuator so as to impart rapid approach, feed, and return movements to the actuator, said valve means including a valve member movable with a step-by-step motion from feed to stop and return positions, and including means operable upon movement of said valve member into feed position to effect reduced delivery of fluid to said actuator, and fluid pressure actuated means for said valve member operative as an incident to the movement of the member into said stop position to shift it into its return position.

8. In a hydraulic control system of the character set forth, the combination with a hydraulic actuator and a pump, of valve means controlling the delivery of fluid by said pump to said actuator comprising a valve member shiftable axially into a plurality of positions including feed, stop and return positions, and including means operable upon movement of said valve member into feed position to effect reduced delivery of fluid to said actuator, means operative automatically in the movement of the actuator to shift said valve member from feed to stop position, and an auxiliary hydraulic actuator alined axially with said valve member and operative in response to the movement thereof into stop position to shift it into return position.

9. In a hydraulic control system of the class set forth, the combination with a hydraulic actuator and a pump of a valve mechanism controlling the delivery of fluid by said pump to said actuator, including a valve member having a plurality of control positions including rapid approach, feed, stop and return, and including means operable upon movement of said valve member into feed position to effect reduced delivery of fluid to said actuator, means operative to initiate a cycle by shifting said valve member into rapid approach position, a member operatively connected with said valve member and actuated in timed relation to the movement of the actuator whereby to shift the valve member successively from rapid approach into feed and stop positions, and fluid pressure operated means automatically operable upon movement of said member into stop position to shift said member from stop to return position.

10. In a hydraulic control system of the class set forth, the combination with a hydraulic actuator and a pump, of valve means controlling the delivery of fluid by said pump to said actuator including a valve sleeve, a valve member reciprocable in said sleeve, a plunger axially alined with and connected to said valve member, a rock shaft having a driving connection with said plunger to move it, and fluid pressure means operative as an incident to the movement of the valve member into one position by said rock shaft to impart an additional shifting movement to the valve member.

11. In a hydraulic control system of the class set forth, the combination with a hydraulic actuator and a pump, of valve means controlling the delivery of fluid by said pump to said actuator including a valve sleeve, a valve member reciprocable in said sleeve, a plunger axially alined with and connected to said valve member, a rock shaft having a driving connection with said plunger to shift it, a pressure chamber intervening between said member and said plunger, remote control means operative to deliver fluid under pressure to said chamber, said plunger having a pressure area effective upon the admission of fluid to the chamber to impart a shifting movement to the valve member.

12. In a hydraulic control system of the class set forth, the combination with a hydraulic actuator and a pump, of valve means controlling the delivery of fluid by said pump to said actuator including a valve sleeve, a valve member reciprocable in said sleeve, a plunger axially alined with and mechanically connected to said valve member, and a hydraulic actuator operative in response to the shifting movement of the valve member into a predetermined position to shift said plunger and thereby to impart an additional shifting movement to the valve member.

13. In a hydraulic control system of the class set forth, the combination with a hydraulic actuator and a pump, of valve means controlling the delivery of fluid by said pump to said actuator including a valve sleeve, a valve member reciprocable in said sleeve, an actuating member axially alined with and connected to said valve member, and fluid pressure operated means for shifting said valve member including a first hydraulic actuator responsive to the movement of the valve member into a predetermined position to impart a shifting movement to said actuating member in one direction, and a second hydraulic actuator operative under manual control for shifting said actuating member in the opposite direction.

14. In a hydraulic control system of the class set forth, the combination with a hydraulic actuator and a pump, of valve means controlling the delivery of fluid by said pump to said actuator including a valve sleeve, a valve member reciprocable in said sleeve, and fluid pressure operated means for shifting said valve member including a first hydraulic actuator responsive to the movement of the valve member into a predetermined position to impart a shifting movement thereto in one direction and a second hydraulic actuator operative under manual control for shifting said valve member in the opposite direction, one of said valve shifting actuators including a member mechanically connected with the valve member and a rock shaft having a driving connection with said member.

15. In a hydraulic control system of the class set forth, the combination with a hydraulic actuator and a pump, of valve means controlling the delivery of fluid by said pump to said actuator including an axially shiftable valve member having a plurality of control positions including rapid approach, feed, stop and rapid return, an actuating member axially alined with said valve member and mechanically connected thereto to move it, manually controlled fluid pressure operated means for shifting said actuating member into rapid approach position, means operative in timed relation to the movement of the actuator to cause said valve member to be shifted successively from rapid approach to feed and stop positions, and an auxiliary hydraulic actuator operative in response to the movement of the valve member into its stop position to shift the valve member into rapid return position.

16. In a hydraulic control system of the class set forth, the combination with a hydraulic actuator and a pump, of a valve mechanism controlling the delivery of fluid by said pump to said actuator, including a valve member having a plurality of control positions including rapid approach, feed, stop and return, means operative to initiate a cycle by shifting said valve member into rapid approach position, a member operatively connected with said valve member and actuated in timed relation to the movement of the actuator whereby to shift the valve member successively from rapid approach into feed and stop positions, fluid pressure operated means for shifting said member from stop to return position, and an auxiliary hydraulic actuator acting upon said member to shift the valve into rapid approach position.

17. In a hydraulic control system of the class set forth, the combination with a hydraulic actuator and a pump of a valve mechanism controlling the delivery of fluid by said pump to said actuator, including a valve member having a plurality of control positions including rapid approach, feed, stop and return, means operative to initiate a cycle by shifting said valve member into rapid approach position, a member operatively connected with said valve member and actuated in timed relation to the movement of the actuator whereby to shift the valve member successively from rapid approach into feed and stop positions, fluid pressure operated means for shifting said member from stop to return position, and fluid pressure operated means operative upon said member to shift the valve into either rapid approach or return positions.

18. In a hydraulic control system for machine tools and the like, the combination with a main hydraulic actuator and a pump, of a valve mechanism controlling the delivery of fluid by said pump to said actuator including an axially movable valve member having a plurality of control positions including rapid approach and rapid return positions, a member mechanically connected with said valve to shift it, a remote control device, fluid pressure operated means controlled by said device for moving said member in one direction into rapid approach position and in the other direction into rapid return position, and an auxiliary hydraulic actuator for said member responsive to a predetermined increase in the pressure applied to the main actuator to move said valve into rapid return position.

19. A hydraulic control system for machine tools and the like comprising, in combination, a hydraulic actuator, a variable delivery pump having a pressure responsive control device, a sump, pressure and exhaust lines leading from the pump and to the sump respectively, a valve controlling the delivery of fluid from said pressure line to said actuator and from the actuator to said exhaust line, said valve having a plurality of control positions including a return position, means responsive directly to the pressure applied by said pump to said actuator for effecting an adjustment of the pump by said pressure responsive device to reduce the rate of discharge of the pump when the pressure exceeds a predetermined value, and a hydraulic actuator also operative in response to the pressure applied to the actuator to shift said valve into its rapid return position.

20. A hydraulic control system for machine tools and the like comprising, in combination, a hydraulic actuator, a variable delivery pump having a pressure responsive control device, a sump, pressure and exhaust lines leading from the pump and to the sump respectively, a valve controlling the delivery of fluid from said pressure line to said actuator and from the actuator to said exhaust line, said valve having a plurality of control positions including a rapid return position, an auxiliary valve having a pressure area directly responsive to pressure applied to said actuator and operative to control the delivery of fluid to said pump adjusting device whereby to vary the adjustment of the pump, an auxiliary hydraulic actuator, and means also controlled by said auxiliary valve for governing the delivery of fluid to said auxiliary actuator whereby to shift said main valve into rapid return position when the pressure upon said pressure area exceeds a predetermined value.

21. A hydraulic control system for machine tools and the like comprising, in combination, a hydraulic actuator, a pump, a variable delivery pump having a pressure responsive adjusting device, a pressure line leading from said pump to said actuator, a control line leading to said device, a valve controlling the connection between said pressure line and said actuator, said valve having a plurality of control positions including a return position, and a control device including a piston and a cylinder connected with said pressure line during the forward travel of the actuator, a spring opposing the movement of said piston by pressure delivered to said cylinder, means operating in the movement of the piston when the pressure in said cylinder is increased beyond a predetermined value to connect said cylinder with said pump control line, an auxiliary hydraulic actuator for said valve including a pressure chamber, and means also operative under the control of said piston to deliver fluid to said pressure chamber whereby to shift said valve into its rapid return position.

22. A hydraulic control system for machine tools and the like comprising, in combination, a hydraulic actuator, a variable delivery pump having a pressure responsive control device, a sump, pressure and exhaust lines leading from the pump and to the sump respectively, a valve controlling the delivery of fluid from said pressure line to said actuator and from the actuator to said exhaust line, said valve having a plurality of control positions including a rapid return position, an auxiliary valve having a pressure area directly responsive to pressure applied to said actuator and operative to control the delivery of fluid to said pump adjusting device whereby to vary the adjustment of the pump, an auxiliary hydraulic actuator, means also controlled by said auxiliary valve for governing the delivery of fluid to said auxiliary actuator whereby to shift said main valve into rapid return position when the pressure upon said pressure area exceeds a predetermined value, and an adjustable orifice control valve for retarding the delivery of fluid to the auxiliary actuator.

23. A hydraulic control system for machine tools and the like comprising, in combination, a hydraulic actuator, a pump, a variable delivery pump having a pressure responsive adjusting device, a pressure line leading from said pump to said actuator, a control line leading to said device, a valve controlling the connection between said pressure line and said actuator, said valve having a plurality of control positions including a return position, and a control device including a piston and a cylinder connected with said pressure line during the forward travel of the actuator, a spring opposing the movement of said piston by pressure delivered to said cylinder, means operating in the movement of the piston when the pressure in said cylinder increases beyond a predetermined value to connect said cylinder with said pump control line, an auxiliary hydraulic actuator for said valve including a pressure chamber, and means also operative under the control of said piston to deliver fluid from said cylinder to said pressure chamber to shift said valve into its return position, the last mentioned means including a duct leading from said cylinder to said pressure chamber and having an adjustable control orifice therein.

24. A hydraulic control system for machine tools comprising, in combination, a hydraulic actuator having forward and return movements, a variable delivery pump having a pressure responsive device for adjusting the rate of delivery of the pump, valve means for controlling the delivery of pressure fluid by said pump to said actuator and having forward and return positions of adjustment, a control device connected with said actuator during the forward movement thereof, said control device being operative to direct fluid under high pressure to said pump adjusting device when the pressure applied to said actuator exceeds a predetermined value, an auxiliary hydraulic actuator, and means including an adjustable orifice interposed between said control device and said auxiliary actuator and also operative when the pressure applied to the main actuator exceeds said predetermined value to effect the movement of the valve means into return position.

25. In a hydraulic control system for machine tools and the like, the combination of a hydraulic actuator, a variable delivery pump having a pressure responsive device for controlling the rate of delivery of the pump, valve means controlling the application of pressure from said pump to said actuator to reciprocate the latter, and means operative automatically in response to an increase above a predetermined value in the pressure applied to the actuator at any point during its forward travel to shift said valve into position to effect return movement of the actuator, said means being also operative in response to such increase in pressure applied to the actuator to actuate said pump adjusting device whereby to reduce the rate of delivery thereof.

26. In a hydraulic control system for machine tools and the like, the combination of pumping means, an actuator, valve means controlling the delivery of fluid from said pumping means to said actuator including a main valve member having an axial bore, a remote control device, and means for supplying a reduced substantially constant pressure to said device including a regulating valve mounted in said bore of the main valve.

27. In a hydraulic control system for machine tools and the like, the combination of pumping means, an actuator, valve means controlling the delivery of fluid from said pumping means to said actuator including a main valve member having an axial bore, a remote control device, and means for supplying a reduced substantially constant pressure to said device including a pressure chamber and a spring pressed regulating valve shiftable in said bore of the main valve and operative to supply fluid from said pumping means to said chamber, said regulating valve being shiftable by pressure in said chamber against the action of said spring.

28. In a hydraulic control system for machine tools and the like, the combination of pumping means, a hydraulic actuator, valve means controlling the delivery of fluid by said pumping means to said actuator including a stationary casing, an axially movable main valve in said casing having an axial bore, a regulating valve member mounted in said bore and spring pressed in one direction, a pressure chamber at one end of said bore, said regulating valve having a pressure area exposed to said chamber and operative in response to an increase in pressure in said chamber to move against the action of said spring, and means operable in all positions of the main valve to supply fluid from said pumping means to said pressure chamber until the pressure therein exceeds a predetermined value as determined by said spring.

MAX A. MATHYS.

REFERENCES CITED

The following references are of record in the file of this patent:

UNITED STATES PATENTS

| Number | Name | Date |
|---|---|---|
| 570,045 | Ongley | Oct. 27, 1896 |
| 1,638,653 | Cannon | Aug. 9, 1927 |
| 1,700,668 | Damerell | Jan. 29, 1929 |
| 1,805,056 | Taylor | May 12, 1931 |
| 1,893,076 | Flygare | Jan. 3, 1933 |
| 1,907,538 | Hanna | May 9, 1933 |
| 1,943,061 | Douglas | Jan. 9, 1934 |
| 2,000,553 | Alden | May 7, 1935 |
| 2,005,018 | West et al. | June 18, 1935 |
| 2,009,608 | Douglas | July 30, 1935 |
| 2,079,640 | Vickers | May 11, 1937 |
| 2,157,240 | Keel | May 9, 1939 |
| 2,165,966 | Hall | July 11, 1939 |
| 2,166,423 | Clark | July 18, 1939 |
| 2,221,313 | Lawrence | Nov. 12, 1940 |
| 2,223,792 | Muir | Dec. 3, 1940 |
| 2,238,060 | Kendrick | Apr. 15, 1941 |
| 2,240,898 | Wiedmann | May 6, 1941 |
| 2,259,636 | Harrington | Oct. 21, 1941 |
| 2,320,759 | Stacy | June 1, 1943 |